April 3, 1962 S. BREEN 3,028,548
MEASUREMENT OF CAPACITIVITY OF MATERIALS
Filed July 31, 1959 2 Sheets-Sheet 1
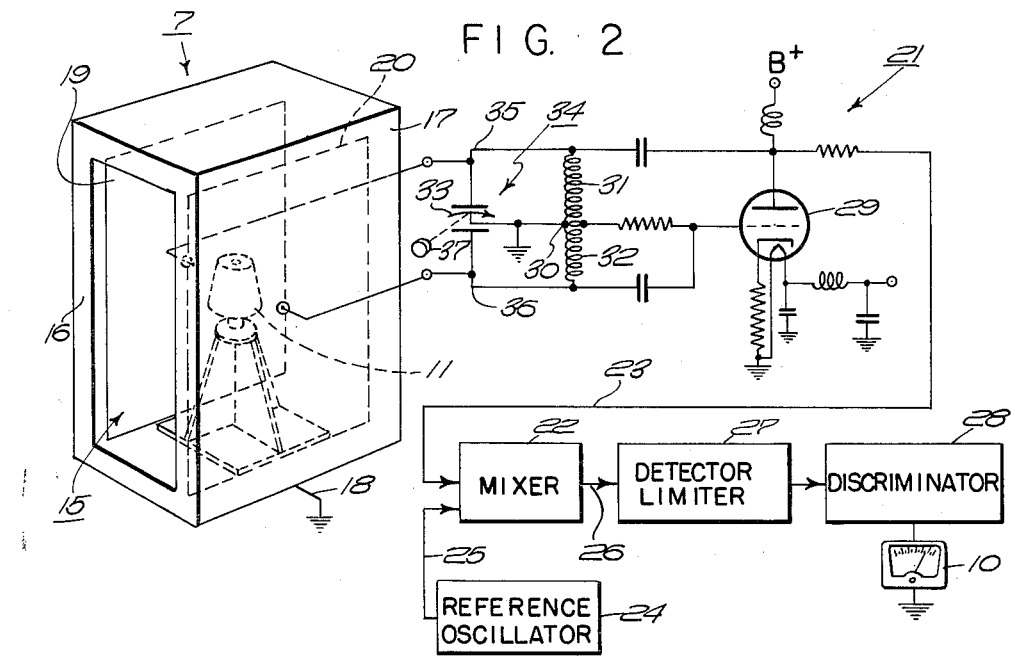
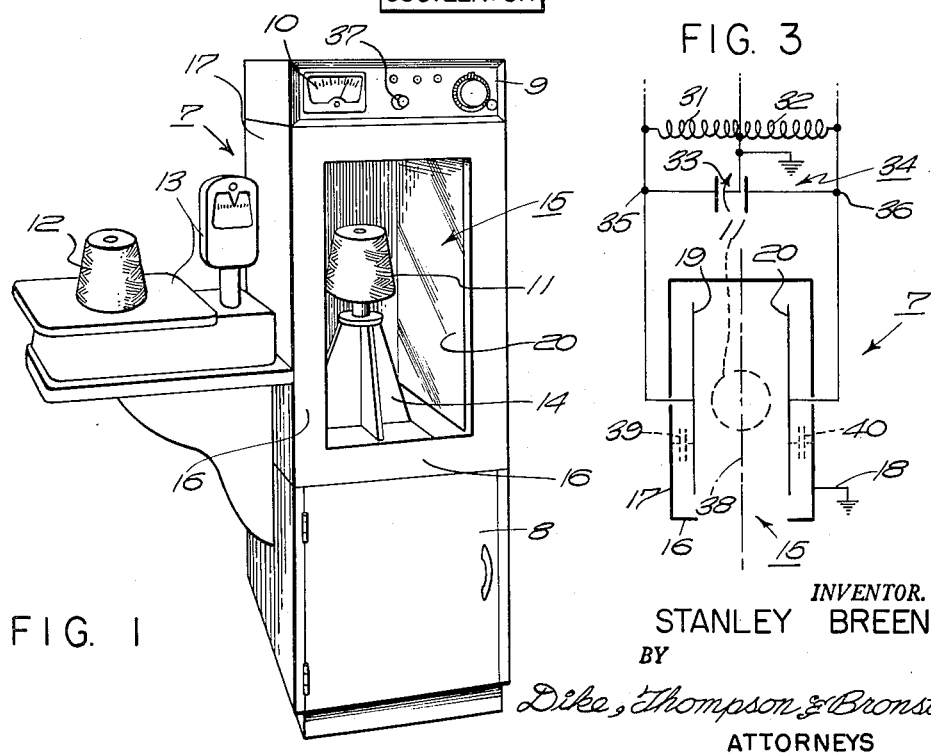
INVENTOR.
STANLEY BREEN
BY
Dike, Thompson & Bronstein
ATTORNEYS April 3, 1962 S. BREEN 3,028,548
MEASUREMENT OF CAPACITIVITY OF MATERIALS
Filed July 31, 1959 2 Sheets-Sheet 2

INVENTOR.
STANLEY BREEN
BY
Dike, Thompson & Bronstein
ATTORNEYS

United States Patent Office 3,028,548
Patented Apr. 3, 1962

3,028,548
MEASUREMENT OF CAPACITIVITY OF MATERIALS
Stanley Breen, Norwood, Mass., assignor to Forté-Fairbairn Inc., Norwood, Mass., a corporation of Delaware
Filed July 31, 1959, Ser. No. 830,773
7 Claims. (Cl. 324—61)

The present invention relates to apparatus for sensing the properties of a substance by measuring its capacitivity, i.e., its effect upon the capacity of an electrical capacitor, and, in one particular aspect, to novel and improved moisture detection apparatus which includes an open capacitor test cell having negligible sensitivity to environmental effects upon stray fields of the cell.

It is known that certain properties of materials, such as moisture content, dimensions, and composition, influence their dielectric constants in predetermined manner. Based upon this recognition, one approach to measurement of a particular property involves inserting a sample of the material into a capacitor test cell, to serve as a dielectric, and then measuring the cell capacitivity exhibited by associated electronic detection equipment. The one property of interest is identified by the measurement if the others are of predetermined values, or negligible, or are of known values which permit corrections to be introduced. Moisture content, which has long been computed on the basis of elementary baking and weighing practices, is a factor of special significance in a number of industries, and the advantages of swift and uncomplicated measurement of this factor through electronic detection techniques have been highly attractive. By way of example, from the moisture content of such materials as textiles, chemicals and foodstuffs one can predict whether they will process and store properly, and costly errors may be avoided if accurate moisture measurements are immediately obtainable.

Test cells and associated electronic equipment for determining capacitivity should of course possess inherently high stability and insensitivity to changes in environmental conditions if measurement errors are to be suppressed. For such reasons, fully closed and electrically shielded test cells have been employed to escape disturbances which might be caused by variations in stray or fringing fields of electrostatic flux. While the closed and shielded cells can develop measurement fields which are nicely isolated from influences of nearby operators and equipment, they also present difficulties in that they necessarily involve movable parts such as covers, doors and hinges required to provide access to their interiors. In cell constructions wherein an electrode surface is moved out of the way between successive tests, one must re-position the electrode with great precision to avoid measurement errors, and even minute differences in the orientations and electrical connections of either the electrodes or the cell shields may be enough to change capacitances and destroy accuracy. Moreover, the provision of doors or covers tends to so restrict access to the cell that loading and unloading of tested samples become awkward and time-consuming. Cells intended to accommodate samples of massive bulk assume such correspondingly large proportions that power actuators may be required to move and correctly re-position their covers, and it would obviously be desirable to eliminate entirely the cost and complexity of such accessory equipment.

According to the present invention, the foregoing disadvantages and difficulties are overcome in stable measurement apparatus including a test cell having no movable parts and having a permanently-defined access opening of substantial proportions. The cell is uniquely constructed such that, in association with a special electrical excitation and detection circuit, it develops a measurement field exhibiting ground potential at a locus centrally of the access opening.

It is one of the objects of the present invention to provide improved measurement apparatus responsive to capacitivity of materials in which inaccuracies due to variations in stray electrostatic fields are minimized.

A further object is to provide improved moisture testing equipment of simple low-cost construction having an open-sided capacitor test cell of stable characteristics which requires no moving parts and which conveniently accommodates samples of large bulk.

Another object is to provide improved capacitivity measurement apparatus having a partially shielded test cell which is a component of a balanced oscillator circuit and in which the measurement electrostatic field possesses a potential gradient minimizing variations in stray fields about an access opening.

By way of a summary account of practice of this invention in one of its aspects, there is provided in an electronic moisture detection system a reference oscillator the output frequency of which is regulated by the capacitance of a test cell, the latter in turn being related to the dielectric characteristics of packages of textile materials disposed within the electrostatic measurement field of the cell for testing. The cell includes two spaced parallel plate electrodes each mounted within and in insulated relationship to an electrically shielding enclosure which is grounded and fully surrounds the electrodes on all sides but one. The unshielded side is open laterally of the main field extending between the electrodes, such that access is afforded to the center of this field where an insulating support for tested samples is located. Rigid insulating composition fills the spaces between the plate electrodes and surrounding enclosure, except intermediate the electrodes and at the site of the access opening, and the shielding is formed as a lip or flange about the opening to shield the edges of the electrodes, whereby the capacitances between the electrodes and shielding remain fixed and substantially uninfluenced by environmental effects. Because of the almost complete grounded shielding of the electrodes, the only leakage field which would tend to escape from the cell would necessarily be restricted to the area of the opening; however, this tendency is suppressed by establishing controlled predetermined potential field gradients. Desired potential field gradients across the opening result from a coupling of the two electrodes into a frequency-determining circuit of a balanced oscillator in an energy exchange relationship which causes the electrodes to assume potentials of instantaneously equal and opposite differences from ground potential.

The subject matter regarded as my invention is particularly pointed out and distinctly claimed in the concluding portion of this specification. However, both as to preferred structure and assembly, and further in relation to objects and advantages thereof, this invention may best be understood through reference to the following description taken in connection with the accompanying drawings, wherein:

FIGURE 1 is a pictorial representation of electronic moisture detection apparatus constructed in accordance with these teachings and adapted for measurement of moisture content of cones of yarn;

FIGURE 2 illustrates electrical circuit and test cell details of measurement apparatus such as that of FIGURE 1, various features being portrayed in pictorial, schematic and block diagram form;

FIGURE 3 is a schematic diagram of the electrical circuit relationships between parts of a test cell and the frequency-determining circuit of a balanced oscillator such as that of FIGURE 2;

Figures 4, 5:
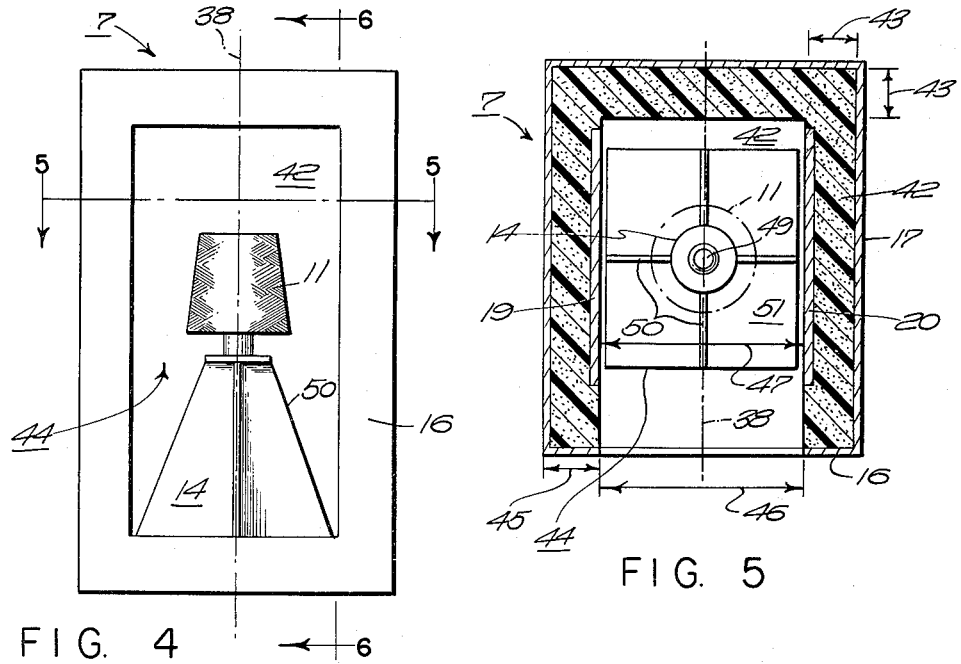
Figure 6:
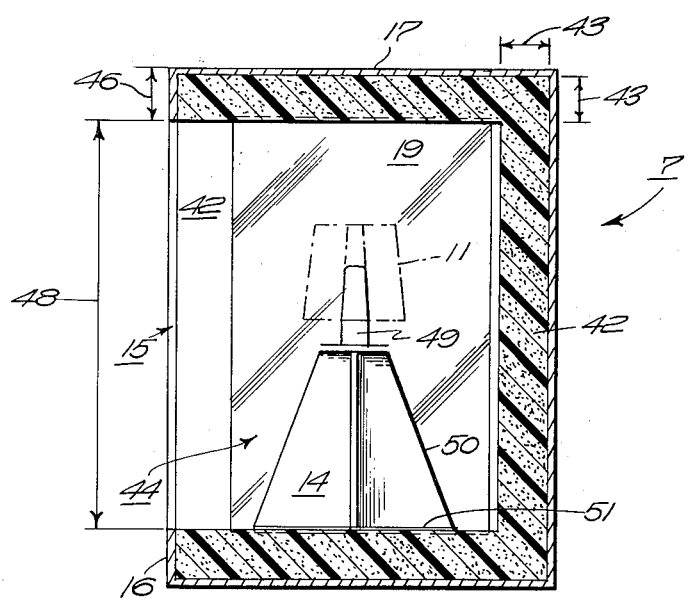

FIGURE 4 presents a front view of the test cell of FIGURE 1, with a sample under test and supporting pedestal visible through the frontal opening;

FIGURE 5 is a cross-sectonal view of the same test cell taken in the direction of the horizontal section designated 5—5 in FIGURE 4; and FIGURE 6 is a cross-sectional view of the test cell taken in the direction of the vertical section designated 6—6 in FIGURE 4.

The embodying apparatus portrayed in FIGURE 1 is in a console form wherein a capacitor test cell unit 7 is elevated by a base cabinet 8 to convenient height for an operator's manipulation of test equipment. A rack 9 of electronic equipment is positioned atop the test cell and displays a measuring instrument 10 from which readings may be taken to characterize the percentage moisture content of tested samples comprising cones of yarn 11. Known weights and sizes of samples of yarn of known fibers should exhibit predetermined dielectric characteristics, such that deviations from specified capacitivity measurements will identify moisture content. Characteristic curves relating moisture content, weight and capacitivity are readily plotted, and simple weighing devices such as the direct-indicating scale 13 conveniently identify the weights of samples, such as cone 12, which must be known before the capacitivity measurements can be translated into values of percentage moisture content. FIGURE 1 illustrates the cone of yarn 11 in a test position centrally within the hollow interior of the cell 7 where it is supported upon an insulating stand 14, the cone having been located properly by manipulations performed through the large rectangular frontal opening 15.

Opening 15 is framed by the relatively narrow rims 16 which are of the same electrically conductive sheet metal as the exterior panelling 17 of cell 7. As is shown in FIGURE 2, both the panelling 17 and rims 16 are maintained at ground potential, by a grounding connection 18, and the rims extend far enough inwardly of the outer edges of the cell to overlie the front edges of two parallel plate capacitor electrodes, 19 and 20, mounted within the cell. Dimensions of the rectangular opening are in excess of the profiles of the tested samples, such that these may easily be manually inserted into and withdrawn from the measurement cavity by an operator. No movable cover member, door or plunger is required for closure of opening 15 during the measurement interval, the measurement cavity being satisfactorily isolated and immune from outside influences because of its unique construction and electrical excitation. When testing is performed, the operator merely weighs each cone, to establish the moisture content vs. capacitivity characteristic it should obey, and places the cone upon the insulating pedestal 14. A reading of instrument 10 is made while no object other than the cone of yarn is situated within the cell, and this reading signifies percentage moisture content for the particular weight of cone tested. The tested sample is of course withdrawn through the cell opening to ready the cell for testing of further samples.

The desired isolation of the measurement cavity from outside influences, without need for a total enclosure having movable closure parts is promoted not only by the specific constructional details of the cell, of which more is said hereinafter, but also by the instantaneous relative potentials of elements of the cell. In the circuit diagram of FIGURE 2, cell 7 is coupled to develop the advantageous instantaneous relative potentials of the electrodes 19 and 20 and the grounded enclosure 17, while simultaneously controlling the frequency of a variable oscillator 21 in accordance with the capacitivities of tested samples of dielectric material. Output signals from this oscillator are applied to a mixer 22 by way of coupling 23, together with the output signals from a reference oscillator 24 appearing in coupling 25. Combination of the two oscillator outputs yields a component of further output signals in coupling 26 which is substantially equal to the differences between oscillator frequencies, the differences preferably being within an audio frequency range. Detector-limiter unit 27 accomplishes a demodulation which results in a signal of frequency substantially equal to the difference in oscillator frequencies, and of constant amplitude irrespective of frequency. The output of detector-limiter 27 is thus found to be in the form of pulses of uniform amplitude and of periodicities corresponding to the differences in output signals generated by variable oscillator 21 and reference oscillator 24. Discriminator 28, which is preferably of a non-resonant type, is excited by the pulse signal output of detector-limiter 27 to deliver current through indicating instrument 10, in the form of an ammeter, which also becomes accurately related to the aforesaid frequency differences and measured capacitivities. Power excitation for the various components of the system is preferably derived from a known form of regulated power supply, not separately illustrated, to promote system stability. If desired, details of circuitry which may be employed for the block-diagram components of the measurement system may be observed through reference to my copending application for "Apparatus and Method for Measuring Capacitivity of a Material," Serial No. 691,269, filed October 21, 1957, and assigned to the assignee of the subject application.

Variable oscillator 21 is of a specially balanced type wherein the test cell 7 is part of the frequency-determining tuned circuitry and wherein the potentials developed across the cell electrodes at any instant establish a ground potential along a plane parallel to and vertically disposed midway between the electrodes. For these purposes, the triode 29 is coupled into an oscillation circuit including tank circuit components which are grounded intermediate their ends. Grounded tap 30 intermediate the two inductance halves 31 and 32 is interconnected with the intermediate electrode structure 33 of a split stator balanced variable capacitor 34; these connections function to preserve the opposite ends 35 and 36 of the capacitor 34 at equal and opposite potentials alternately above and below ground; the variable plates are properly adjusted for a predetermined operating frequency as by manipulation of a knob 37. The capacitor formed by test cell electrodes 19 and 20 is coupled in parallel with capacitor 34, such that the frequencies of oscillation are regulated by capacitance of cell 7 alone when all else in the variable oscillator circuitry is unchanged. In addition, the voltage-dividing effects of the grounded center-tapped tank circuit inductance and capacitance units insure that the electrostatic field between test cell electrodes 19 and 20 has a potential gradient which crosses ground potential about midway therebetween.

Referring to the FIGURE 3 schematic representation of the frequency-determining circuitry, and to the FIGURES 4 and 5 illustrations of the test cell, the plane located by double-dashed linework 38 and occurring midway between cell electrodes 19 and 20 is the locus of substantially ground potential at all times. Unavoidable capacitances between each of the plates 19 and 20 and the grounded enclosure 17 have been symbolized by the dashed-line capacitances 39 and 40, respectively, in FIGURE 3, and it will be recognized that these are effective to preserve the needed electrical symmetry with respect to ground. Such symmetry, which promotes the desired simultated ground plane 38, obviously cannot result with known shielded cells wherein the grounded outer shield is itself one of the electrodes.

The cell construction detailed in FIGURES 4 through 6 maintains all test cell parameters and properties substantially fixed, such that output frequencies of the variable oscillator will characterize only the capacitivities of measured samples. The aforementioned stray capacitances 39 and 40 between the grounded outer enclosure and each electrode are preserved substantially constant by the stable insulation 41 appearing therebetween and also appearing in all interior spaces other than those which must remain vacant as part of the measurement cavity itself. Preferably, this insulation material, 42, is in the form of commercially available rigid polystyrene foam sheets which line the sheet metal enclosure 17 to a uniform depth 43, as illustrated. Insulating bonding cement for this material secures the lining firmly with the sheet metal of the enclosure and further causes the two electrodes 19 and 20 to adhere securely to the foamed sheets in the illustrated parallel spaced positions on opposite sides of the measurement cavity 44. These electrodes are shown recessed into lining material 42 in FIGURE 5 to present a smooth side wall surface to the cavity, although the thin electrodes may be cemented atop the insulating lining in other embodiments.

The rim or lip 16 framing the frontal opening 15 is shown to extend inwardly by distances 45, FIGURES 5 and 6, which may be the same or different but which impose certain limits upon the width and height of the opening. In width, noted by dimension 46, this opening does not exceed the separation 47 of the parallel cell electrodes, and, in height 48, the opening does not exceed the vertical height 49 of the two like rectangular electrodes 19 and 20. Within these relative proportions, and with the aforementioned filling by insulating material 42, the stray electrostatic fields which tend to travel between the cell electrodes and the grounded outer shield traverse primarily the insulating and filler material. Accordingly, the important stray capacitances are caused to remain fixed, whereas on the other hand a larger frontal opening would tend to develop variable fringing fields with the cell electrodes which thread through unshielded regions having unstable dielectric characteristics. Electrostatic flux lines extending between the two cell electrodes also tend to be straight, and normal to the electrode surfaces, rather than threading outwardly as leakage flux through the frontal opening. This is true because of the plane of ground potential appearing at the position of lines 38, whereby objects external of the cell and having potentials near ground potential are not sought out by the lines of flux in the measurement field. Were one of the cell electrodes grounded, instead, the field between it and the opposite electrode would tend to be diverted to outside objects through any large opening, and it would be necessary to close the opening, or reduce its size to unsatisfactorily small values, or to dispose the electrodes so far inwardly thereof that the cell becomes excessively large and the measurement cavity too remote for convenient loading and unloading of samples.

The illustrated cell is one wherein it is particularly intended that the generated electrostatic field have parallel flux lines uniformly distributed throughout that region of the measurement cavity where the evaluated samples are to be situated. This is so critical that it necessitates cell capacitor electrodes which are very substantially larger than the outline of the samples, as is shown, and yet the isolation of this sensitive uniform field which results from the effects of grounded shielding and unique potential gradients are so complete that the frontal opening 15 can also be made of correspondingly large proportions. Insulating stand 14 conveniently supports the cones of yarn at the optimum position in the cavity upon its spindle 49 affixed at the top of the four legs 50 rising from a base 51. A symmetrical form for the stand is desirable, to avoid distortions of the electrostatic flux field, and material such as polystyrene is preferred for its unvarying dielectric characteristics and low dielectric constant.

The test cell configurations and proportions may of course be varied to meet requirements and convenience in the testing of materials and samples of size, shape and consistency unlike those of the cones of yarn which have been referred to. Similarly, the variable oscillator circuit which has been depicted in connection with a preferred embodiment may assume other forms, provided the tank circuit grounding is effective to develop the simulated site of ground potential about midway between the plate of the test cell. Accordingly, while preferred embodiments of this invention have been shown and described herein, those skilled in the art will recognize that various changes, modifications and substitutions may be effected without departing either in spirit or scope from the invention in its broader aspects as set forth in the appended claims.

What I claim as new and desire to secure by Letters Patent of the United States is:

1. Capacitor test cell apparatus responsive to capacitivity of substances and adapted to be coupled into a measurement system, comprising a pair of capacitor electrodes, means mounting said electrodes in insulated relationship with a hollow measurement region therebetween for accommodating quantities of said substances, electrically conductive shielding material in enclosing and insulated relationship to said electrodes, said shielding material having an access opening therethrough communicating with said hollow measurement region, means maintaining said shielding material at ground potential, an electrical circuit responsive to capacitance therein producing at two terminals thereof instantaneous potentials which are simultaneously of opposite polarities in relation to said ground potential, means coupling said electrodes with different ones of said terminals and thereby introducing the capacitance between said electrodes into said circuit and applying said instantaneous potentials across said electrodes to generate an electrostatic field in said measurement region having a potential gradient determined by said instantaneous potentials and having a substantially ground-level potential the locus of which intersects said access opening, whereby leakage flux through said opening is suppressed, and means for coupling said circuit into a measurement system.

2. Capacitor test cell apparatus responsive to capacitivity of substances and adapted to be coupled into a measurement system, comprising a pair of capacitor electrodes having substantially planar conductive surfaces, means mounting said electrodes in insulated relationship with said surfaces in spaced parallel relationship on opposite sides of a hollow measurement region, electrically conductive material shielding and enclosing said electrodes in insulated relationship thereto, said shielding material having an access opening therethrough communicating with said measurement region and dimensioned to permit quantities of said substances to be inserted into and removed from said region therethrough, means mantaining said shielding material at ground potential, a frequency-determining electrical circuit producing at two terminals thereof instantaneous potentials which are simultaneously of substantially equal magnitudes and opposite polarities in relation to said ground potential, means coupling said electrodes with said terminals and thereby introducing the capacitance between said electrodes as a frequency-controlling capacitance in said circuit and applying said instantaneous potentials to said electrodes to generate an electrostatic field in said measurement region having a potential gradient which is at said ground potential substantially midway between said electrodes and intersecting said access opening, whereby leakage flux through said opening is suppressed, and means for coupling said circuit into a measurement system.

3. Capacitor test cell apparatus responsive to capacitivity of substances and adapted to be coupled into a measurement system, comprising a pair of capacitor electrodes disposed in spaced insulated relationship with a hollow measurement region therebetween for accommodating quantities of said substances, an electrically conductive enclosure surrounding and electrically shielding said electrodes in spaced relationship thereto, said enclosure having an access opening therethrough extending alongside peripheral edges of said electrodes and communicating directly with said measurement region, said enclosure framing said opening to shield said edges of said electrodes near said opening, means maintaining said enclosure at ground potential, insulating material filling substantially all the spaces within said enclosure other than said measurement region and the communication thereof with said opening, an electrical circuit responsive to capacitance therein producing at two terminals thereof instantaneous potentials which are simultaneously of opposite polarities in relation to said ground potential, means coupling said electrodes with said terminals and thereby introducing the capacitance between said electrodes into said circuit and applying said instantaneous potentials across said electrodes to generate an electrostatic field in said measurement region having a potential gradient which is at ground potential at a position between said electrodes and intersecting said access opening, whereby leakage flux through said opening is suppressed, and means for coupling said circuit into a measurement system.

4. Capacitor test cell apparatus responsive to capacitivity of substances and adapted to be coupled into a measurement system, comprising a pair of capacitor electrodes, means mounting said electrodes in spaced insulated relationship with a hollow measurement region therebetween for accommodating quantities of said substances, electrically conductive material in enclosing and shielding relationship to said electrodes and insulated therefrom, said conductive material having an access opening therethrough communicating with said hollow measurement region, means grounding said conductive material, an oscillator having first, second and third connections for frequency-determining tank circuitry, means grounding said first of said connections, frequency-determining tank circuitry, means connecting one part of said tank circuitry between said first and second connections and another part of said tank circuitry between said first and third connections, means coupling each of said electrodes with a different one of said second and third connections, whereby the capacitance between said electrodes is part of said tank circuit and the electrostatic field in said measurement region has a potential gradient which includes ground potential at a position between said electrodes and intersecting said access opening, whereby leakage flux through said opening is suppressed, and means for coupling said oscillator into a measurement system.

5. Capacitor test cell apparatus as set forth in claim 4 wherein said tank circuit includes inductance means having a first inductance connected between said first and second connections and a second inductance connected between said first and third connections, two capacitor means coupled in series and connected in parallel with said inductance means across said second and third connections, and means connecting the common intermediate part of said series-coupled capacitor means with said first of said connections.

6. Capacitor test cell apparatus responsive to capacitivity of substances and adapted to be coupled into a measurement system, comprising a pair of planar rectangular capacitor electrodes, means mounting said electrodes vertically in spaced parallel relationship with a hollow measurement region therebetween for accommodating quantities of said substances, a hollow enclosure of electrically conductive material surrounding both of said electrodes in spaced insulated relationship thereto, said enclosure having a rectangular front access opening therethrough in a vertical plane extending alongside vertical peripheral edges of said electrodes and communicating with said measurement region, said enclosure of conductive material forming a rim about said opening in electrically shielding relationship to said vertical edges of said electrodes near said opening, means maintaining said enclosure at ground potential, a stand of insulating material mounted within said enclosure to extend vertically between said electrodes and shaped to support quantities of said substances centrally of said measurement region, a frequency-determining electrical circuit producing at two terminals thereof instantaneous potentials which are simultaneously of opposite polarities in relation to said ground potential, means coupling said electrodes with said terminals and thereby introducing the capacitance between said electrodes as a frequency-controlling capacitance in said circuit and applying said instantaneous potentials to said electrodes to develop an electrostatic field through said measurement region having a potential gradient which is at said ground potential in a plane substantially midway between said parallel electrodes and substantially midway between the vertical edges of said front opening, whereby leakage flux through said opening is suppressed, and means for coupling said circuit into a measurement system.

7. Capacitor test cell apparatus responsive to capacitivity of substances and adapted to be coupled into a measurement system, comprising a pair of substantially flat rectangular capacitor electrodes disposed vertically in spaced parallel relationship with a hollow measurement region therebetween for accommodating quantities of said substances, a hollow enclosure of electrically conductive material surrounding both of said electrodes in spaced relationship thereto, said enclosure having a rectangular access opening through a front vertical wall thereof extending alongside vertical peripheral edges of said electrodes and communicating with said measurement region, said front wall of said enclosure having a rim of said conductive material about said opening in electrically shielding relationship to said vertical edges of said electrodes near said front wall, rigid foamed insulating material lining the interior of said enclosure and supporting said electrodes in fixed spaced insulated relationship to the walls of said enclosure and in said parallel relationship to one another, said insulating material filling the spaces between said electrodes and said rim of conductive material about said front opening other than spaces of said measurement region and the communication of said region with said opening, means maintaining said enclosure at ground potential, a frequency-determining electrical circuit producing at two terminals thereof instantaneous potentials which are simultaneously of substantially equal magnitudes and opposite polarities in relation to said ground potential, means coupling said electrodes with said terminals and thereby introducing the capacitance between said electrodes as a frequency-controlling capacitance in said circuit and applying said instantaneous potentials to said electrodes to develop an electrostatic field through said measurement region having a potential gradient which is at said ground potential in a plane substantially midway between the vertical edges of said front opening and substantially perpendicular to said front wall, whereby said electrostatic field is substantially confined to the interior of said enclosure and leakage flux through said opening is suppressed, and whereby the stray capacitances between each of said electrodes and said enclosure are substantially constant, and means for coupling said circuit into a measurement system.

References Cited in the file of this patent

UNITED STATES PATENTS

| | | |
|---|---|---|
| 2,419,266 | Kliever et al. | Apr. 22, 1947 |
| 2,422,742 | Odessey | June 24, 1947 |
| 2,516,768 | Grob et al. | July 25, 1950 |
| 2,604,513 | Parkinson et al. | July 22, 1952 |
| 2,923,881 | Bernet | Feb. 2, 1960 |

FOREIGN PATENTS

| | | |
|---|---|---|
| 207,792 | Australia | Dec. 14, 1954 |